Figure 1:
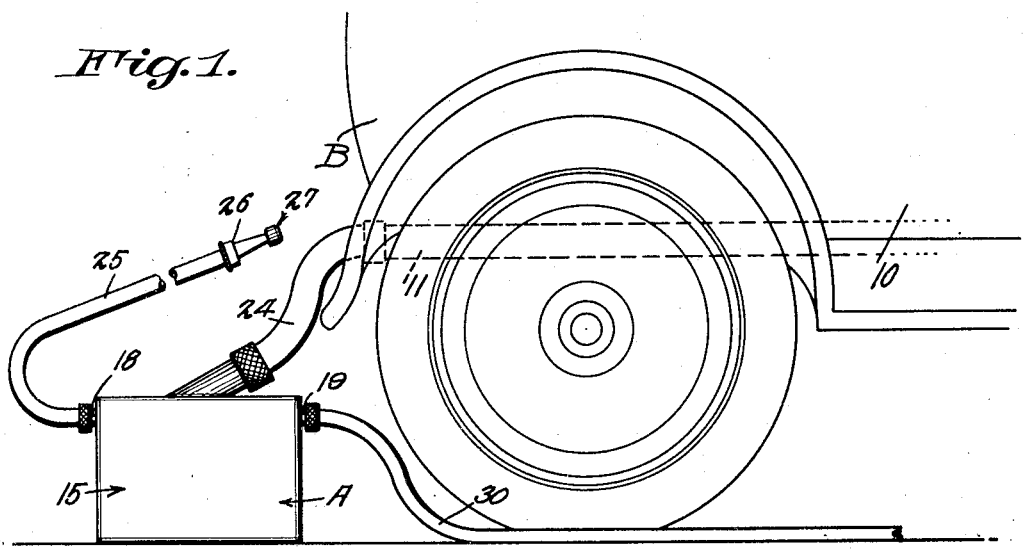

Aug. 12, 1930.  G. MARENTI  1,773,051
AUTOMOBILE ATTACHMENT
Original Filed Feb. 16, 1927

Gus Marenti  Inventor

By Richard B. Owen  Attorney

Witnesses
C. E. Churchman Jr.

Patented Aug. 12, 1930

1,773,051

UNITED STATES PATENT OFFICE

GUS MARENTI, OF WASHINGTON, DISTRICT OF COLUMBIA

AUTOMOBILE ATTACHMENT

Application filed February 16, 1927, Serial No. 168,595. Renewed March 15, 1930.

This invention relates to attachments for internal combustion engines and more particularly to a novel cleaning appliance for use in conjunction with automobiles.

One of the primary objects of the present invention is to provide a novel cleaning attachment comprising a portable base having means for permitting the connection thereof with an exhaust pipe of an automobile for creating a continuous suction in said base, the suction being utilized for various cleaning purposes.

Another salient feature of the invention is the provision of a novel cleaning attachment for automobiles comprising a chamber having an outlet at one end and an inlet at the opposite end, the outlet having a cleaning hose connected therewith and means for detachable connection with exhausts of automobiles leading into the outlet pipe for creating a suction in rear of the pipe, whereby water or other cleaning fluid will be drawn in through the inlet and commingled with the exhaust flowing through the outlet.

A further object of the invention is the provision of a novel cleaning device for automobiles comprising a box like structure to form a support having arranged therein a compartment provided with an inlet and outlet, the compartment also having means for connection with the exhaust of an automobile for leading the exhaust into the outlet pipe for creating a suction in rear thereof, the suction being utilized to draw in water or other cleaning fluid through the inlet, whereby the cleaning fluid can be expeditiously forced against the surface to be cleaned.

A further object of the invention is the provision of a novel cleaning hose connected with the outlet of the compartment, the nozzle of the hose being provided with an annular cleaning pad entirely surrounding the outlet end thereof, thereby permitting the nozzle of the hose to be used as a combined cleaner and scraper against the surface to be cleaned.

A further object of the invention is the provision of a cleaning attachment for automobiles which can be used not only as means for washing the vehicle, but also as a vacuum cleaner for permitting the convenient cleaning of the interior of the vehicle, the inlet of the compartment in this instance being used as a connection for the suction hose of the vacuum cleaner.

A still further object of the invention is to provide a novel feeding attachment for automobiles of the above character, which will be durable and efficient in use, one that will be simple and easy to manufacture, and one which can be placed upon the market and incorporated with a conventional automobile at a small cost.

Figure 2:
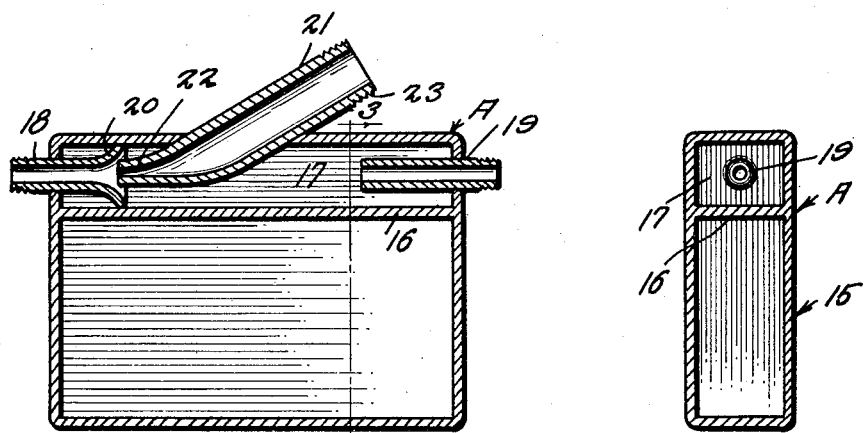
Figure 3:
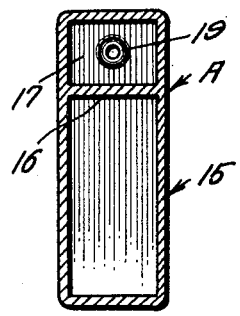
Figure 4:
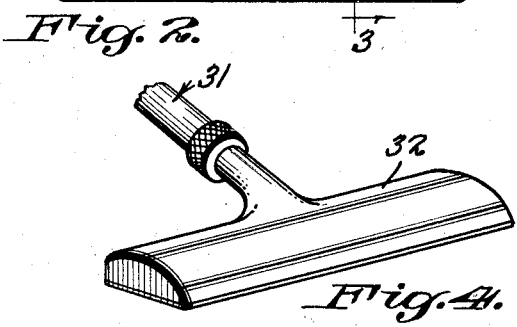
Figure 5:
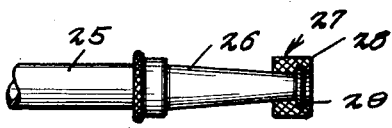

With these and other objects in view, the invention consists in the novel construction, arrangement and formation of parts as will be hereinafter more specifically described, claimed, and illustrated in the accompanying drawings, in which drawings:

Figure 1 is a side elevation of the improved cleaning attachment showing the same connected with the exhaust pipe of an automobile, Figure 2 is a vertical longitudinal section through the base of the attachment, Figure 3 is a transverse section through the same taken on the line 3—3 of Figure 2 looking in the direction of the arrows, Figure 4 is a perspective view showing a vacuum cleaner nozzle and pipe which can be used with the attachment, and Figure 5 is a detail side elevation of the cleaning nozzle showing the novel cleaning pad connected therewith, the pad being shown in section.

Referring to the drawing in detail, wherein similar reference characters designate corresponding parts throughout the several views, the letter A generally indicates the improved attachment and B an automobile with which the same can be used.

The automobile B forms no part of the present invention and has been shown to illustrate the use of the attachment. As shown the vehicle B includes the usual body 10 having an exhaust pipe 11 leading to the rear end thereof.

The improved attachment A comprises a base 15, which can be of any desired shape or size and provided with suitable handles or the like to facilitate the carrying thereof.

The base 15 is preferably of a hollow construction and the upper end thereof is provided with a horizontal partition 16 providing a compartment 17 which forms one of the salient features of the present invention.

One end of the compartment 17 is provided with a restricted outlet pipe 18, while the opposite end is provided with an inlet pipe 19. The outer ends of the pipes 18 and 19 are preferably externally threaded for permitting the connection of suitable hose thereto, as will be later described.

The outlet pipe 18 extends into the compartment 17 and is provided with a flared inlet end or venturi 20.

Extending from the base 15 at an angle of substantially thirty degrees to the horizontal is an exhaust inlet pipe 21. This pipe extends into the compartment 17 and terminates in an injector nozzle 22, which is disposed in close proximity to the flared end 20 of the outlet pipe 18.

The outer end of the pipe 21 is externally threaded as at 23 so that a hose 24 can be connected therewith. This hose 24 is arranged for detachable connection with the rear end of the exhaust pipe 11.

The outlet pipe 18 is adapted to receive a flexible cleaning hose 25 having any preferred type of nozzle 26 at its outer end. This nozzle is utilized for delivering water or other cleaning fluid against the surface to be cleaned.

This nozzle is equipped with a novel cleaning tip 27 for facilitating the removal of hard substances upon the surface being cleaned. This cleaning tip 27 comprises an annular body 28 formed of any desired material, such as rubber. The outer end of the tip 27 is provided with a lip 29 which is adapted to overlie the outer end of the nozzle and this lip is adapted to be brought into contact with the substance to be removed on the surface being cleaned.

A water hose 30 leading from any suitable source of supply is connected with the inlet pipe 19.

In use of the improved device the pipe 24 is connected with the exhaust pipe 11 and the engine of the automobile is started in operation. The flow of exhaust into the outlet pipe 18 will create a suction in rear of the pipe causing the sucking in of water or other cleaning fluid through the pipe 19. This water or other cleaning fluid will be broken up into a fine spray by the exhaust and the exhaust will deliver the same with considerable force against the surface to be cleaned. As stated the tip 27 can be rubbed against the surface when hard objects are to be removed therefrom.

The improved device can also be successfully used as a vacuum cleaner and in this instance the hose 30 is removed from the pipe 19 and a suction hose 31 is connected therewith. This suction hose 31 has detachably connected therewith any preferred type of suction nozzle 32. In this instance the hose 25 is not used and it can be seen that the exhaust flowing into the outlet tube 18 will create a suction at the pipe 19. The suction nozzle 32 can be conveniently used for cleaning the interior of the car, such as the upholstery thereof.

From the foregoing description it can be seen that I have provided a novel and simple attachment to be used in connection with automobiles for facilitating the cleaning thereof.

While I have shown the hose 24 connected with the rear end of the exhaust pipe 11, of the automobile 10 it is to be understood that this hose can be connected to the exhaust pipe 11 at any point intermediate the ends thereof either in front or in rear of the conventional muffler, by the use of suitable fittings, (not shown).

The nozzle 26 can be provided with a suitable covering formed of non-heat conducting material or a suitable handle of non-heat conducting material can be connected with the nozzle whereby the hand of the user will be protected from heat from the exhaust.

Changes in details may be made without departing from the spirit or scope of this invention, but:

What I claim as new is:

A pump attachment for an internal combustion engine for the purpose specified comprising a casing entirely independent of the engine forming a supporting body, a fluid inlet pipe at one end of the casing, a fluid outlet pipe at the opposite end of the casing having an inner flared intake portion and a connection for the exhaust of the engine leading into the casing at an angle toward the outlet pipe between the inlet and outlet pipes and terminating in said flared intake portion in spaced relation to the walls thereof.

In testimony whereof I affix my signature.

GUS MARENTI.